United States Patent [19]

Piech et al.

[11] 4,331,045
[45] May 25, 1982

[54] PNEUMATIC CONTROL SYSTEM FOR AN AUTOMATIC VEHICLE TRANSMISSION

[75] Inventors: Ferdinand Piech, Ingolstadt; Heinz Dörpmund, Wolfsburg; Gerd Oberpichler, Brunswick; Ernst-August Honig; Dieter Schmidt, both of Wolfsburg, all of Fed. Rep. of Germany

[73] Assignee: Volkswagenwerk Aktiengesellschaft, Wolfsburg, Fed. Rep. of Germany

[21] Appl. No.: 61,058

[22] Filed: Jul. 26, 1979

[30] Foreign Application Priority Data

Aug. 1, 1978 [DE] Fed. Rep. of Germany ....... 2833641

[51] Int. Cl.³ .................. B60K 41/22; F16D 43/22; B60K 41/06
[52] U.S. Cl. .................................... 74/867; 74/877; 192/0.032; 192/0.076; 192/103 R
[58] Field of Search .............. 74/869, 877, 865, 878, 74/867, 868; 192/0.032, 0.076, 0.096, 3 H, 3.57, 103 R

[56] References Cited

U.S. PATENT DOCUMENTS

| 2,387,346 | 10/1945 | Pennington | 192/3.57 X |
| 2,785,582 | 3/1957 | Banker | 74/877 |
| 3,438,285 | 4/1969 | Hanzi et al. | 74/869 |
| 3,978,743 | 9/1976 | Murakami | 74/869 |
| 4,020,718 | 5/1977 | Miyauchi et al. | 74/869 |
| 4,046,032 | 9/1977 | Braun et al. | 74/877 X |

FOREIGN PATENT DOCUMENTS

| 589600 | 12/1959 | Canada | 74/867 |
| 2307516 | 9/1973 | Fed. Rep. of Germany . | |
| 46-31246 | 9/1971 | Japan | 74/869 |

*Primary Examiner*—Rodney H. Bonck
*Attorney, Agent, or Firm*—Brumbaugh, Graves, Donohue & Raymond

[57] ABSTRACT

A pneumatic control system is disclosed for an automatic transmission for a vehicle of the type having a mechanical planetary gear train with hydraulically actuatable gear elements. A manual control valve dependent upon the position of the transmission gear select lever conveys a pressure medium, for actuating a gear shift element associated with the selected gear when said lever is moved to one of the forward gears of the transmission, through a pressure medium line connected between the manual control valve and the gear shift element. The control system comprises a main control valve dependent upon the position of the accelerator pedal for exhausting the fluid in the gear shift element for disengaging the gear shift element in operating states of the vehicle at least when the vehicle is stationary, the transmission gear select lever is moved to the drive position (D), and the accelerator pedal is released.

10 Claims, 2 Drawing Figures

PNEUMATIC CONTROL SYSTEM FOR AN AUTOMATIC VEHICLE TRANSMISSION

BACKGROUND OF THE INVENTION

The present invention relates to a pneumatic control system for an automobile automatic transmission of the type having a mechanical planetary gear train with hydraulically actuated gear shift elements for shifting of the transmission elements. A manual control valve, dependent upon the position of the transmission gear select lever (hand operated), conveys a pressure medium when one of the forward gears is engaged for actuating a gear shift element (forward gear clutch) associated with the gear.

In automatic hydrodynamic-mechanical transmission, the turbine of the hydrodynamic torque converter is normally connected positively with the drive gears, when one of the forward gears is selected, by a so called forward gear clutch. Even during idle, however, the engine transmits hydraulic energy through the convertor pump to the turbine wheel so that a moment is produced which causes the vehicle to crawl, i.e. to travel slowly forward even though the accelerator pedal is released. Usually, then, in the case of automatic transmissions, the brake must be employed to keep the vehicle stationary or the gear select lever must be moved in the neutral position.

Crawling of the vehicle during idling may also be eliminated by providing a special clutch arranged between the turbine wheel and engine actuated by an electrical idling switch. An additional clutch of this type, however, requires considerable space and is costly.

SUMMARY OF THE INVENTION

The present invention is a pneumatic control system for an automobile automatic transmission of the type having a mechanical planetary gear train with hydraulically actuatable gear shift elements in which the transmission of engine force during idling, which produces crawling when one of the transmission forward gears is engaged, is automatically interrupted.

More particularly, in accordance with the present invention a manual control valve dependent upon the position of the transmission gear select lever conveys a pressurized first fluid through a pressure medium line, when one of the forward gears is engaged, to actuate a gear shift element (forward clutch) associated with the selected gears. A main control valve, dependent upon the position of the accelerator pedal, is arranged between the manual control valve and the gear shift element and acts to interrupt the delivery of the first pressurized fluid to the element, and at the same time exhaust the fluid in the gear shift element, thereby to disengage the forward clutch, at selected operating states of the vehicle at least when the vehicle is stationary, the gear select lever is in the drive (D) position, and the accelerator pedal is released. The control valve may also be coupled to other engine operating parameters and may be controlled in response, for example, to the speed of the vehicle or the position of the gear select lever, as described below.

In the preferred embodiment, the main control valve includes a piston which is acted on by a spring in opposition to an accelerator pedal position-dependent second fluid pressure, preferably air. The piston is moveable between a first position when the spring force is greater than the accelerator pedal position-dependent second fluid pressure, in which the pressure medium line leading to the gear shift element is connected with a pressure medium outlet to release the forward clutch, and a second position when the force on the piston of the accelerator pedal position-dependent second fluid pressure exceeds that of the spring. In the second position, the pressure medium line leading to the gear shift element is connected to the pressure line from the manual control valve for supplying hydraulic fluid under pressure to the element to actuate the forward gear clutch.

The piston is provided with a first piston surface at one end acted on by the spring and a second piston surface at its opposite end acted on by the accelerator pedal position-dependent second fluid pressure. The second piston surface is connected by a pressure line which over a throttle point is connected with a pressure line providing an engine load-dependent pressure. The pressure in this line, which is utilized in various points of the control system of a customary hydrodynamic mechanical transmission, will also vary essentially with the position of the throttle valve of the vehicle and thus the position of the accelerator pedal such that the second piston surface is acted on by a pressure which is dependent upon the accelerator pedal position.

Thus, in idling states of the engine, the pressure in the engine load dependent pressure line decreases, and thus the second fluid pressure decreases to provide less force in opposition to the spring on the control valve piston. The spring, therefore, will tend to push the piston toward the first position interrupting the flow of fluid to the gear shift element and exhaust the fluid in the gear shift element to disengage the clutch. Some pressure, however, will still be present (a so-called zero gas pressure) in the engine load dependent pressure line. To assure, therefore, that at idling, when the accelerator pedal is released, a complete release of a forward clutch is obtained, the engine load-dependent pressure line is connected with a purging control valve, actuatable by the accelerator pedal, which may be incorporated into a conventional kick-down valve. When the accelerator pedal is released, the purging valve vents the pedal position-dependent pressure line so that the second fluid pressure, acting on the piston in opposition to the spring, is reduced to zero (atmospheric).

The purging control valve has a control piston displaceable in a longitudinal bore in a piston valve. The accelerator pedal acts on the control piston such that when the pedal is released, the engine load-dependent pressure line is connected to a pressure medium outlet (atmosphere). Thus, when the accelerator pedal is released, the pressure in the line acting on the main control valve is atmospheric. When the accelerator pedal is at least partially depressed, the pressure medium outlet is blocked by the control piston and the engine load-dependent pressure is again provided to act on the piston of the main control valve. The purging control valve may be arranged so that the connection with the pressure medium outlet is blocked when the accelerator pedal is only slightly depressed.

At times when the accelerator pedal is released, and the pressure in the line leading to the main control valve drops to atmospheric, a throttle in the engine load-dependent line prevents the pressure in that line from dropping to atmospheric upstream of the throttle.

It may not be desirable to disconnect the forward gear clutch, when the accelerator pedal is released, for all operating states of the vehicle, for example, when the vehicle is operated in mountainous regions or under special load conditions. In hilly regions, by keeping the forward gear clutch engaged, the creeping movement of the vehicle during idling may be used for starting on hills. Also, it may be desired to use engine braking which would be lost were the forward gear clutch to be released. Thus, in accordance with the invention, when the gear select lever is moved to selected positions, e.g. "1" or "2", pressure is automatically provided to the main control valve piston to overcome the force of the spring such that the forward gear clutch remains engaged independent of the position of the accelerator pedal. This may be achieved by a three-way valve inserted into the accelerator pedal-dependent pressure line leading into the main control valve, which disconnects the accelerator pedal-dependent line in favor of a line carrying main engine pressure when the gear select lever is in one of the preselected positions, so that pressure delivery will not be interrupted when the accelerator pedal is released.

The control valve may also be controlled as a function of vehicle speed so that the forward gear clutch is disengaged only when the vehicle is stationary and not when the vehicle is decelerating or coasting. A second piston surface is provided which is connected to a speed dependent pressure which acts on the piston in the same direction as the accelerator pedal position pressure, that is, in opposition to the spring. Thus, when the speed dependent pressure is sufficient, that is, the vehicle is traveling at or above a predetermined minimum speed, the force on the piston overcomes the spring force to maintain the forward gear clutch engaged regardless of whether any additional pressure is imparted on the piston from the accelerator pedal position-dependent pressure line. A speed dependent pressure source is likewise available in conventional control systems for hydromechanical transmissions of this type.

For a better understanding of the invention, reference is made to the following detailed description of the preferred embodiments of the invention, taken in conjunction with the drawings of the application.

DETAILED DESCRIPTION OF THE PREFERRED EMBODIMENTS

Figure 1:
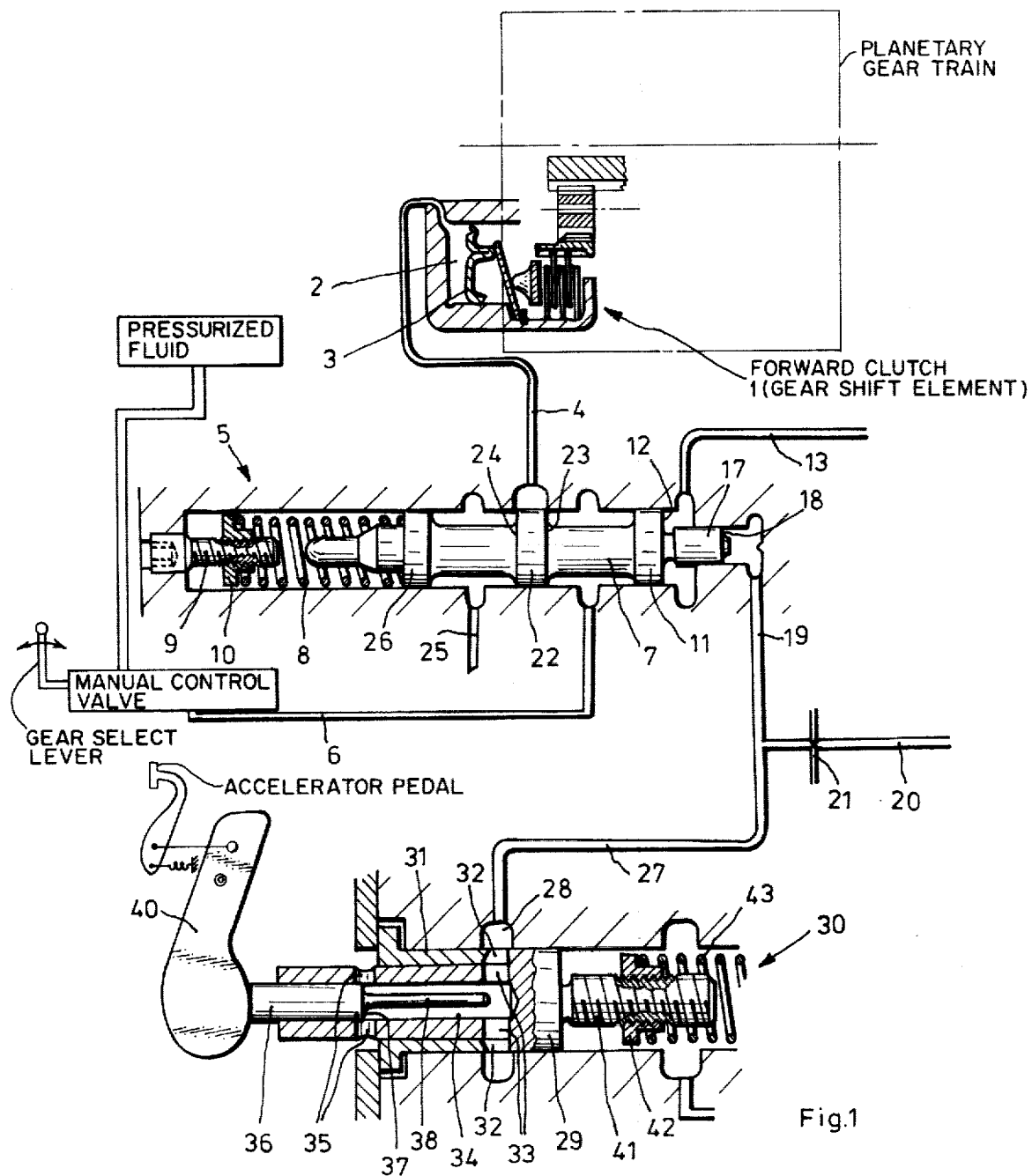
FIG. 1 is a schematic cross-section of a control system in accordance with the invention for providing accelerator pedal position-dependent control of the gear shift element associated with the forward gears.

Referring to FIG. 1, a pneumatic control system is shown for an automobile automatic transmission of the type having a mechanical planetary gear train with hydraulically actuatable gear shift elements for optional shifting of the transmission elements. A forward clutch 1 associated with the forward gears of the hydrodynamic mechanical automobile transmission includes a pressure chamber 2 and an actuating piston 3. The pressure chamber 2 is connected with a first pressurized fluid line 4, which is connected through a main control valve 5 to the pressure fluid line 6 coming from a manual control valve, not shown. Connection between the lines 4 and 6 is controlled as a function of the position of the accelerator pedal of the vehicle by the main control valve 5. The pressure fluid line 6 provides main pressure in all forward gears which means that it carries the highest pressure utilized in the transmission control system produced by the gear pump and is regulated dependent on engine load by the so-called main pressure slide valve (not shown).

The main control valve 5 has a piston 7 which is loaded by a spring 8 acting on the piston collar 26. The force of the spring 8 can be adjusted by an adjustment screw 9 acting on the spring retainer 10. The spring 8 is opposed by an accelerator pedal position-dependent second fluid pressure provided through a line 19 to the end face 18 of the piston collar 17, which acts as a piston surface. The second fluid pressure line 19 is connected over a throttling point 21 with a pressure line 20 which may be connected to a source of second fluid pressure which is a function of the engine load, which is also used in the transmission control, namely, controlled in dependence of the position of the throttle valve and thereby the accelerator pedal, which pressure is lower than the main pressure.

A second piston surface 12 on the piston collar 11 of the piston 7 is connected to a source of speed-dependent fluid pressure through a pressure medium line 13. Like the accelerator pedal position-dependent pressure, the speed-dependent pressure acts in opposition to the spring force of the spring 8. As in the case of the engine load-dependent pressure, the speed-dependent pressure is available as a governing pressure in customary transmission control systems.

The piston 7 is displaceable from the center position shown in the drawing either towards the left or towards the right, depending on the spring force and the instantaneous pressure forces from the lines 13 and 19, acting in opposition to the spring 8. As the piston 7 moves right or left, a pair of control edges 23 and 24 on the piston collar 22 connect the pressure medium line 4 either with the pressure medium line 6 to provide fluid under pressure to the pressure chamber 2 (to actuate the forward gear clutch 1), or with a pressure medium outlet 25, thereby causing the forward gear clutch 1 to disengage. The clutch 1, therefore, disengages during operating states of the vehicle when the force of the spring 8 exceeds the combined forces on the piston surface 18 (the accelerator pedal-dependent pressure) and the circular ring-shaped piston surface 12 (the speed-dependent pressure). The force exerted by the spring 8 and, the piston surfaces 12 and 18 are chosen such that the spring force of the spring 18 predominates only if the vehicle is stationary or moving at less than a predetermined speed, and if, simultaneously, the accelerator pedal is released.

A purging control valve 30 is also connected to the engine load pressure-dependent line 20 to assure that when the accelerator pedal is released, the pressure line 19 does not continue to transmit pressure to the piston surface 18 (the idling gas pressure), but rather is completely purged through connection with a pressure medium outlet 35. The valve 30 may be a so-called kickdown valve which is provided in the known transmission control systems, and actuated by an actuation lever 40, connected with the accelerator pedal, which engages the valve piston 29. The purging valve 30 has a control piston 36 which can be displaced in a longitudinal bore 34 within the normal play associated with the idling position of the accelerator pedal. The longitudinal bore 34 is connected through transverse bores 33, the end-face clearances 32 of a guide bushing 31, and a housing pocket 28, to a purging line 27, which in turn communicates with the pressure line 19. One or more transverse bores 35 connect the longitudinal bore 34 with atmosphere, to function as pressure medium outlet. Connection between the outlets 35 and the bore 34 (and thereby the purging line 27) is controlled by an end-face control edge 37 of the control piston 36.

The kick-down valve 30 is connected with a gas pressure valve, not shown here, delivering the gas pressure of the line 20. A spring 43, acting on a spring plate 42 adjustable on a threaded rod 41 of the piston 29, pushes the piston 29 of the valve 30 towards the left in the drawing against the guide bush 31 functioning as a stop. The drawing shows the accelerator pedal and the actuating lever 40 connected thereto in the released position. With the accelerator pedal released, lever 40 also releases the control piston 36 and the pressure prevailing in the line 27 displaces the piston 36 to the left. The pressure medium outlets 35 are thereby opened, so that the pressure in the line 27 and thereby also in the line 19 drops to almost atmospheric pressure. The throttling point 21 in the connection to the gas pressure line 20 prevents the pressure in the gas pressure line 20 from likewise dropping to atmospheric pressure; rather, the pressure upstream of the throttle 21 remains at the so-called zero (idling) gas pressure level.

The purging of the pressure line 19 through the purging line 27 and outlets 35 assures that when the accelerator pedal is released, the piston 7 of the main control valve 5 is pushed by the spring 8 to the right against no counterforce on the piston surface 18. Assuming then that the vehicle is also stationary and not coasting or decelerating, and that there is little or no speed dependent pressure acting on the piston surface 12, the piston 7 is moved to the right by the spring force and the pressure medium line 4 is connected with the pressure medium outlet 25 across the reduced thickness portion of the piston 7 between the piston collars 22 and 26. As a result, the pressure medium chamber 2 of the forward gear clutch 1 is vented and the clutch disengages. The positive connection between the turbine wheel of the torque converter and the vehicle wheels is thereby interrupted so that a creeping of the vehicle cannot occur. At the same time, this measure prevents vibrations, which would otherwise be transmitted by the engine over the transmission to the vehicle wheels during idling, from becoming noticeable.

If the vehicle is moving above a predetermined minimum speed, the forward gear clutch 1 remains engaged regardless of the accelerator pedal position (released or depressed). The speed-dependent pressure, carried over the pressure medium line 13 to the circular ring-shaped piston surface 12 of the piston 7, displaces the piston 7 in opposition to the force of the spring 8 to the left in the drawing. In this position of the piston 7, the pressure medium line 4 is connected with the pressure line 6 from the manual control valve (not shown), such that the main pressure conveyed over the pressure line 6 is directed into the pressure chamber 2 of the forward gear clutch 1 to maintain the actuating piston 3 in the engaged position. Once again, this occurs independent of the pressure delivered over the pressure line 19, i.e., independent of the position of the accelerator pedal, to assure that the clutch 1 is disconnected only during idling, and not during deceleration or coasting.

When the vehicle is stationary, the forward gear clutch 1 is re-engaged only when the accelerator pedal is depressed past the path of free movement (play) associated with its idling position. The control piston 36 is moved to the right until the stop bolt 38 encounters the piston 29 at the end of the longitudinal bore 34 or the lever 40 engages the outer end face of the piston 29 itself, whereby the control edge 37 closes off the transverse bores 35. Once the outlets 35 are blocked, the gas pressure in line 19 builds up again to the zero gas pressure, which is already sufficient to displace the piston 7 to the left for connection of the pressure medium line 4 with the line 6. Accordingly, the closing off of the pressure medium outlet bores 35 by means of the control edge 37 of the control piston 36 occurs even before the accelerator pedal is actuated out of its idling position for acceleration of the vehicle engine.

Figure 2:
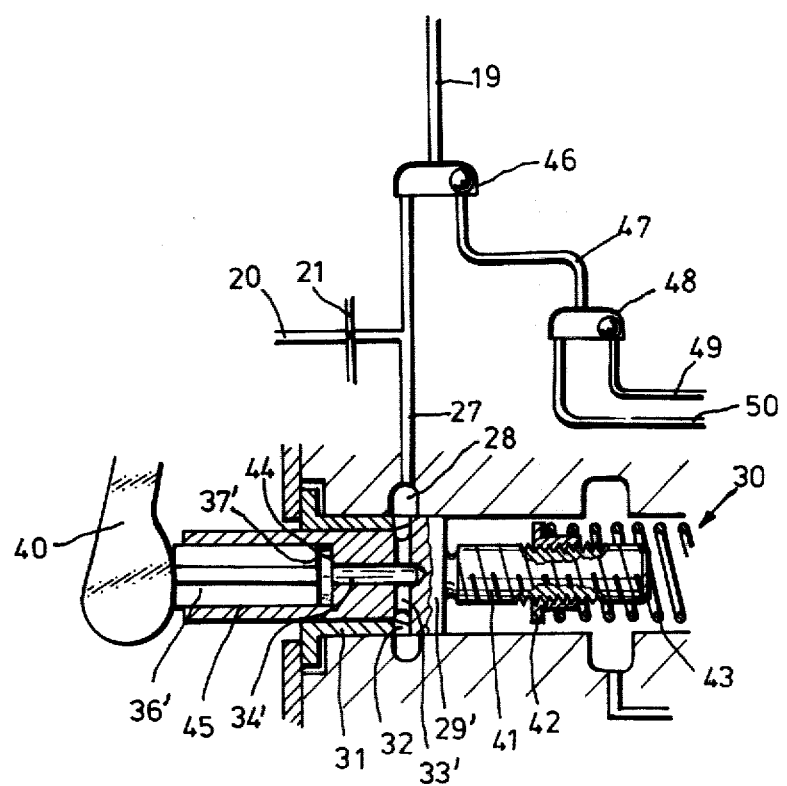
FIG. 2 is a schematic sectional view of a portion of a modified control system.

FIG. 2 illustrates a modified form of main control valve actuatable by means of the accelerator pedal. In this form, the control piston 36' of the purging valve 30 has grooves along the outer periphery, for permitting the pressure medium to discharge when the control edge 37' moves away from the shoulder 44. Moreover, the piston 36' does not slide directly in the longitudinal bore 34' but slides in a bore 45 which has a larger diameter than the bore 34'. When the accelerator pedal is depressed in order to overcome the free travel in the idling position, the actuating lever 40 engages the piston 36', and the end-side control edge 37' of the control piston 36' is displaced towards the shoulder 44 between the bores 45 and 34' to block the connection between the bore 34' and the pressure medium outlets, which may be the open end of the bore 45. The mode of operation of this embodiment corresponds to that in FIG. 1 so that here again, after the free travel associated with the idling position of the accelerator pedal, the connection of the pressure line 19' with the outlet is blocked so that the raised zero gas pressure of the gas pressure line 20 is again present in the pressure line 19. This pressure is sufficient to move the piston 7 of the main control valve 5 to the left, as shown in the FIG. 1, so that the control edge 23 of the piston collar 22 produces a connection of the pressure medium line 4 with the pressure line 6 to actute the clutch 1.

In the FIG. 2 embodiment, a three-way ball valve 46 is inserted in the line 19. The three-way ball valve 46 is connected by a pressure line 47 with a second three-way ball valve 48. Pressure lines 49 and 50, which open into the second three-way ball valve 48, provide main pressure by way of the manual control valve, not shown, to the line 19 and thereby the piston 7, whenever the transmission gear select lever is moved to positions "1" or "2" (as opposed to "Drive" (D)). In these select lever positions associated with specific load operating conditions of the vehicle, the pressure line 19 receives main pressure as a result of special switching of the three-way valves 46 and 48. This pressure assures that the piston 7 of the control valve 5 is always maintained in its left end position, i.e., in the clutch engagement position, when the transmission gear select lever is in the "1" or "2" position. Thus, at specific load operating positions of the select gear lever, a "creeping" of the vehicle becomes possible.

Such a delivery of main pressure in one or both load positions "1" or "2" of the gear select lever, by way of the three-way ball valves (which, depending on the preponderance of the pressure in one or the other supply line in each case closes off the other line), may also be inserted into the pressure delivery line 13 so that the circular-ring-shaped piston surface 112 of the piston 7, too, displaces the piston 7 on pressure admission, into the clutch engagement position.

The invention has been shown and described with reference to certain preferred embodiments thereof. Variations and modifications will be apparent to those skilled in the art without departing from the inventive principles disclosed herein. For example, the control valves 30, 30', decreasing the pressure in the pressure line 19 to atmospheric pressure when the accelerator pedal is released, are illustrated as fluid, preferably pneumatic, controlled valves. It is possible, however, to provide here electrical or also mechanical control apparatus, which when the accelerator pedal is fully released, connects the pressure medium line 19 with a pressure medium outlet and which after a predetermined free path has been overcome, i.e., without the engine having terminated its idling operation, blocks off the pressure medium outlet. All such modifications and variations are intended to be within the scope of the invention as defined in the following claims.

We claim:

1. In an automatic transmission for a motor vehicle, having an accelerator pedal, said transmission having a mechanical planetary gear train with hydraulically actuatable gear shift elements, a gear select lever having a plurality of selectable forward drive positions, including automatic forward drive (D), a source of first pressurized hydraulic fluid, a manual control valve, responsive to the position of said select lever, for supplying said first fluid to a selected gear shift element when said lever is in one of said forward drive positions, and a fluid line communicating between said manual control valve and said selected element for delivering said first fluid from said manual control valve to said selected element, a control system for selectively interrupting the supply of said first fluid to said selected element, comprising a main control valve arranged in said fluid line between said manual control valve and said selected element for controlling the supply of said first fluid from said manual control valve to said selected element, said main control valve being responsive to the position of said accelerator pedal and controlling the supply of said first fluid to said element to discontinue said first fluid supply and exhaust the fluid from said element to disengage said element in selected vehicle operating conditions, said conditions including when said vehicle is stationary, said gear select lever is in automatic drive (D), and said accelerator pedal is released.

2. A control system according to claim 1, wherein said main control valve means comprise piston means, spring means acting on said piston means, means for providing an accelerator pedal position-dependent second fluid pressure for acting on said piston means in opposition to said spring means, for moving said piston means to a first position when the spring force on said piston means exceeds the accelerator pedal position-dependent second fluid pressure force for connecting said gear shift element with a fluid outlet and a second position when said accelerator pedal position-dependent second fluid pressure force exceeds the spring force for connecting said gear shift element with said manual control valve for providing said first fluid under pressure to said gear shift element.

3. A control system according to claim 2, wherein said piston means has a first piston surface acted on by said spring means and a second piston surface acted on by said accelerator pedal position-dependent second fluid pressure, and wherein said means for providing said accelerator pedal position-dependent second fluid pressure includes a source of engine load-dependent pressure.

4. A control system according to claim 3, further comprising purging control valve means for venting the second fluid pressure supplied to said second piston surface when said accelerator pedal is released, and wherein said source of engine load-dependent pressure includes throttle mmeans therein.

5. A control system according to claim 4, wherein said purging control valve means comprise a control piston displaceable in a longitudinal bore of a piston valve, wherein said accelerator pedal engages said control piston when at least partially depressed, said control piston having a control edge for opening a connection to a pressure medium outlet when said accelerator pedal is released and for interrupting said connection when said accelerator pedal is partially depressed.

6. A control system according to claim 4 or 5, wherein said vehicle includes a kick-down control valve, and wherein said purging control valve means are contained in said kick-down control valve.

7. A control system according to claim 1, wherein said forward drive positions include lever positions associated with a specific load operation, wherein said control system further includes means for delivering main fluid pressure to a piston surface on said piston means for acting in opposition to said spring means when said gear select lever is moved to one of said specific load operations.

8. A control system according to claim 7, comprising three-way valve means for supplying second fluid pressure to said second piston surface for selectively connecting said piston with a source of said main fluid pressure when said gear select lever is moved to a position corresponding to specific load operation.

9. A control system according to claim 1, further comprising means for controlling said main control valve as a function of vehicle speed.

10. A control system according to claim 9, wherein said piston means further comprises a third piston surface and, wherein said speed control means comprises means for delivering a speed dependent third fluid pressure for acting on said third piston surface for opposing the force of said spring.

* * * * *